Figure 1:
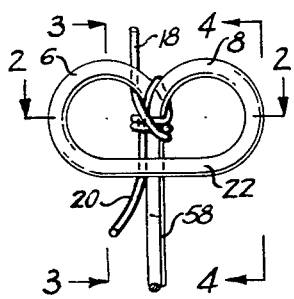

June 13, 1961  H. D. BLEILER  2,987,845
TIE CLIP FOR FISH LINES AND THE LIKE
Filed Feb. 26, 1958  3 Sheets-Sheet 1

INVENTOR
HORACE D. BLEILER

June 13, 1961 H. D. BLEILER 2,987,845
TIE CLIP FOR FISH LINES AND THE LIKE
Filed Feb. 26, 1958 3 Sheets-Sheet 2
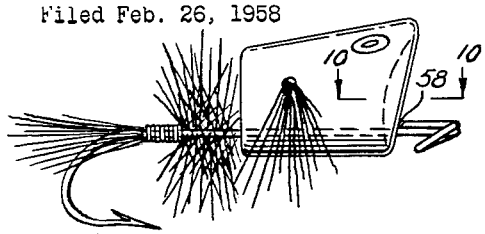
FIG. 9
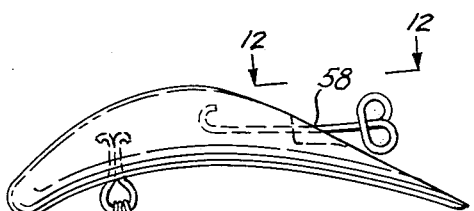
FIG. 11
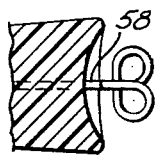
FIG. 10
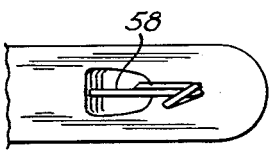
FIG. 12
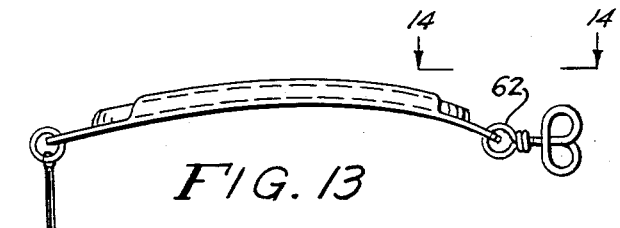
FIG. 13
FIG. 20
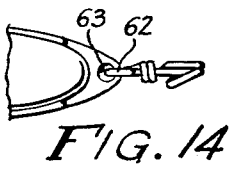
FIG. 14
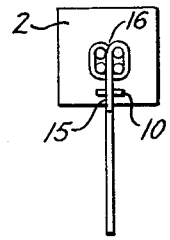
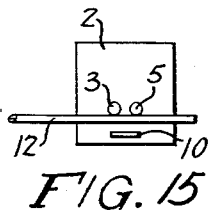
FIG. 15
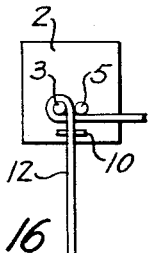
FIG. 16
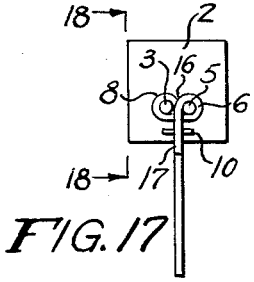
FIG. 17
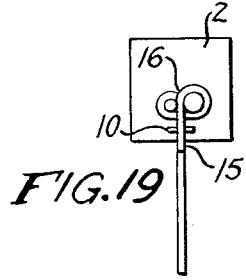
FIG. 19
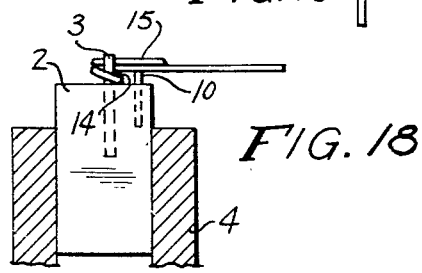
FIG. 18
INVENTOR
HORACE D. BLEILER

INVENTOR
HORACE D. BLEILER

United States Patent Office 2,987,845
Patented June 13, 1961

2,987,845
TIE CLIP FOR FISH LINES AND THE LIKE
Horace D. Bleiler, Scranton, Pa.
Filed Feb. 26, 1958, Ser. No. 717,680
9 Claims. (Cl. 43—42.49)

This invention relates to a tie clip for quick tying of the ends of flexible fishing lines, cords and ropes to an object on which the tie clip is mounted.

The principal object of this invention is to provide a simple wire clip for the attachment of resilient monofilament and braided nylon fishing lines to fishing tackle to which the end may be quickly and firmly tied and just as easily untied without weakening the line.

A further object is to make an efficient wire tie clip for fishing line and the like, having a double loop, with wedge angles formed between adjacent portions of the wire loops for frictionally holding the line which may be placed therein against slipping, while the loose end of the line is held against at least one of said portions by passing the line one or more times around said loose end and said one portion, the last turn of the line around said end and portion being thus cushioned against its preceding turns if any, or against the corresponding wire loop, so as to reduce the sharpness of its last bend in the clip where the maximum stresses of the line are applied, and thus to reduce the weakening strains such as would be produced at normally knotted portions of a line by sharp bends at the maximum stress points of these knotted portions.

A further object is to form the above double loop by forming a single loop having its ends drawn together in substantially parallel relationship and bent at their juncture inwardly of said loop to cross the opposite side of said loop at a clearance of less than the normal diameter of the line to be used therewith whereby to form a double-loop clip.

A further object is to make a quick attachment of a line to an object by providing the object at the point of attachment with a single wire clip having a shape adapted for receiving the line in a wedge-locking twist without requiring a tight bend in any high stress portion of the twist.

A further object is to provide a simple wire clip fixture to serve as an anchor to which a line may be quickly fastened, or unfastened for sliding adjustment therein and refastening at a different point of the line, as may be desired in the adjustment of venetian blind or awning raising cord-lines, boat docking lines, etc.

A further object is to make a simple wire clip of the above type in the form of a loop with its ends turned parallel and continguous to each other inwardly of the loop, crossing adjacent its outer lobe and then forming the base of the clip which may be fixed in any suitable manner to the object to which it may be desired to attach the line.

A further object is to make the above wire clip with the parallel ends of the wire turned in a plane substantially normal to that of the loop, and to provide a restricted clearance between the cross-over portion of the loop and the nearest of the parallel ends, whereby a line end may be held in the inner of the grooves formed on opposite sides between the parallel ends, and the line passed over the outer angle of the two eyes formed by the loop and then twisted around the parallel ends of the wire under the cross-over portion of the loop one or more turns, snapping the line through the restricted clearance at each turn to prevent unravelling of the line and thus maintain a firm attachment thereof to the clip, until it is desired to unfasten it when the turns may be just as easily unwound by snapping the line outwardly past this clearance, at each turn until its end is freed.

A further object is to provide underwater lures with a clip of the above type positioned so that its looped portion will be in a substantially vertical plane.

A further object is to provide top-water lure with a clip of the above type positioned so that its looped portion will be in a substantially horizontal position.

A further object is to provide the above type of wire clips with the parallel ends or stems turned normal to the loop in different directions to make them suitable for different handed persons, right eye end being turned toward the loop for right-handed persons; the left eye end being so turned for left-handed people.

A further object is to make the double-eyed clips of the above type on a die comprising two pins of suitable gauge extending from a flat surface, and being spaced in accordance with the desired spacing of the eyes formed by the loop of the clip, by placing a length of a suitable wire against the base of both pins, bending one end of the wire around the corresponding pin 270° bringing it between the pins down over the portion extending between the base of the pins, to extend in a direction at right angles thereto and to a stop at a level above the flat surface for suitably spacing the wire over said portion, then bending the other end of the wire 270° in the opposite direction around its corresponding pin and between the pins against the top of and parallel to the other end of the wire, to form the other eye of the loop and the external angle between the eyes as well as the axial grooves formed by the parallel ends.

A further object is to provide a wood screw base for the above type of clip.

A further object is to provide a base having holes for the attachment of the straight contiguous end portions of the clip.

Figure 2:
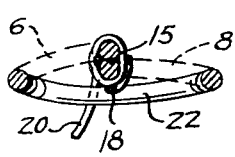
Figure 7:
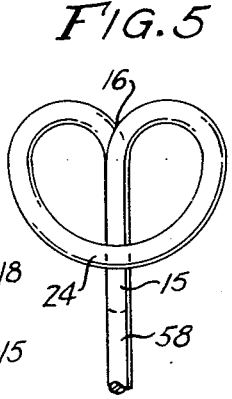
Figures 3, 4:
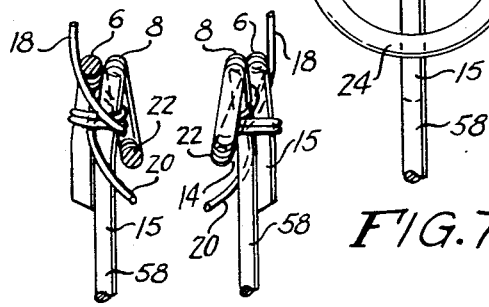

Other and more specific objects will become apparent in the following detailed description of some preferred forms of the invention as illustrated in the accompanying drawings, wherein:

FIG. 1 illustrates one form of wire clip constructed in accordance with the present invention showing one way of attaching a line thereto without weakening the line by sharp bends, FIGS. 2 and 3 are sectional views taken on the lines 2—2 and 3—3, respectively, of FIG. 1, FIG. 4 is a side view taken on the line 4—4 of FIG. 1, FIGS. 5 to 8 illustrate different forms of loop that may be used in the double-eye type of wire clip, FIG. 9 illustrates an application of the double-eye type of clip to a top-water lure of the fly type, FIG. 10 is a sectional detail view of the clip portion thereof, FIG. 11 illustrates an application of the double-eye type of clip to an under-water lure of the flatfish type, FIG. 12 is a partial top view taken on the line 12—12 of FIG. 11.

Figure 21:
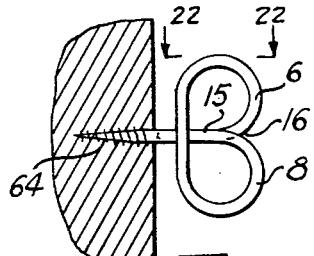
Figure 22:
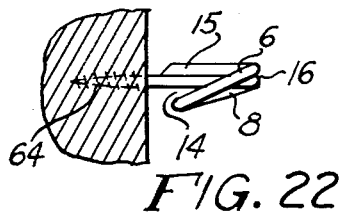
Figure 23:
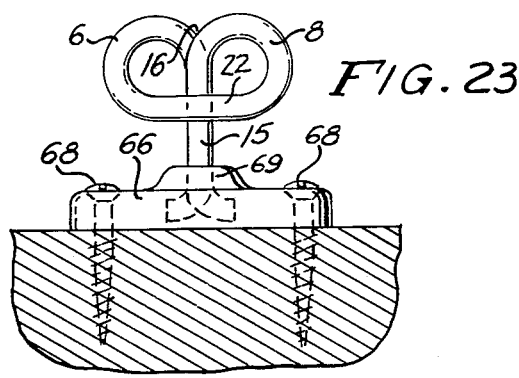
Figure 24:
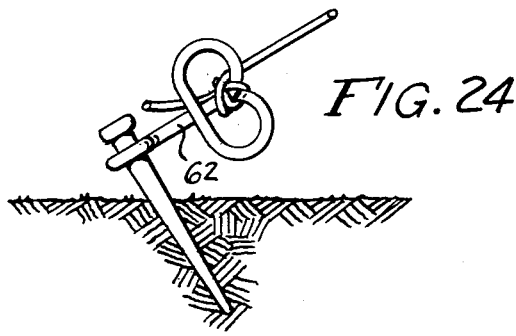
Figure 26:
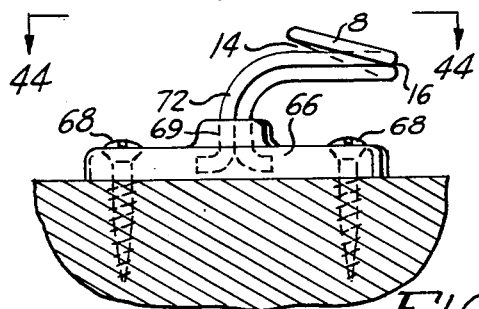
Figure 25:
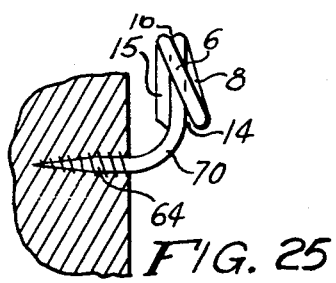
Figure 27:
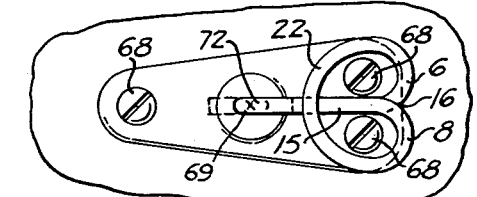

FIGS. 13 and 14 are similar views of another underwater type of lure having the double-eye type of clip with a ring base, FIGS. 15 to 20 illustrate dies and the manner of forming the double-eye clips of different shapes, FIGS. 21 and 22 are two views of a double-eyed clip having a screw base for fixing to woodwork, FIG. 23 is an elevation of a double-eyed clip having a base plate for fixing straight contiguous end portions to the plate, FIG. 24 shows another use for the tie clip with a ring base, FIG. 25 illustrates a double-eye clip having a screw base bent at right angles to the plane of the loop, and FIGS. 26 and 27 are two views of a double-eye clip having a base similar to that shown in FIG. 23, but the shank of the clip is bent to bring the plane of the loop substantially parallel to the surface on which the base is mounted.

Fish lines or snells commonly referred to by manufacturers as "monofilament lines" or "plastic leader material," are difficult to tie to the present one-eye type of attachment because of their resiliency to curvature and deformity due to stress, becoming stiffer and more difficult to handle through usage and age. The possibility of undetected fracture to the line occurs in the knot or at the metal of the eye because of its inconformity to the sharper perimeters of curvature. Fishermen usually water-soak these lines, to eliminate such possibilities, prior to their attachment to one-eye fishing equipment, which means a delay in the start of fishing or probable intermediate delays through breakage of lines, especially as they get more brittle by drying in the hot sun. This invention eliminates many of these possibilities of fracture of lines at the point of contact of the attachment as the curvature of the line on the attachment will not be any greater than the milder curvature around the double thick stems of the present invention.

Water-soaked plastic lines can be locked on the attachment clips of the present invention by one additional turn to those windings required for braided and twisted lines. Some of the plastic lines can be locked on the attachment with two turns, but because of their irregularities of hardness and texture, the smoother surface and resiliency, and the application of various gauge lines to perimeters and angles formed by one gauge wire metal, an additional turn is normally required to lock water-soaked plastic lines to the attachment clip when a stress is applied to the fish rod line.

Tests made on the usual means of joining lures to fishing lines have demonstrated that practically all the stress applied to the line is transmitted to the knot. Because of the sharp curvature for an extended angle of contact around the small radius of the metal at this point or the sharp curvature created in the knot along the line, the line tends to break on variable stresses because of the irregularities in the formation of the knots, without any possible increase in the tensile strength at the knot.

The present invention eliminates the necessity of using such weakening knots or sharp curvatures. The windings on the double stem of the attachment cause a deformity of the tying end of the line in the V-shaped groove between the separating stems of the attachment clip and bind it against the stems with sufficient friction to create a bight in the angle formed at the junction of two rounded metal eyes when a stress or pull is applied to the line. Further the invention contains the positioning and operation of retaining the line in place on the attachment by a retention loop, all to the extent of tying the line on the attachment clip without the application of knots such as were necessary in previously used methods of tying.

The invention decreases the sharpness of line angles below that of ordinary knots and allows locking of the line in position on the surface of the design with increased tensile strength at the point of contact. The simplicity of application of lines securely to lures equipped with this novel attachment clip will have a definite general public appeal as it eliminates the weakening irregularities of knot formation and possible slippage of the harder texture lines, and requires no special treatment of, or practical experience with, the various line materials manufactured.

The essential features of the present invention on which all the objects previously enumerated are based, is the formation of a groove between two adjacent portions of the wire of which the attachment or tie clip is made, in which groove the end of a line may be placed, and a curved wedge saddle at an end of this groove where the two portions curve in opposite directions to form the tangent eyes of the clip, over which saddle the line may be then passed and wound around said portions to frictionally bind its end in said groove and saddle, so as to form a quick non-slip attachment without any sharp bends in the line.

One form of the tie clip made in accordance with this invention is shown in FIGS. 1 to 4, and may be made on a die as shown in FIGS. 15 to 18 comprising a flat topped anvil 2, which may be held in a vise 4, and having a pair of pins 3 and 5 of a diameter substantially that of the internal diameter of the eyes 6 and 8 (FIG. 1) of the tie clip to be formed. These pins are firmly mounted in the top of the anvil in spaced relation, their spacing being substantially equal to the diameter of the wire used. A rest plate 10 is fixed in the top of the anvil suitably spaced from the pins and extending to a predetermined level above the anvil surface in a plane substantially parallel to that of the pins 3 and 5.

The clip may be made by placing a length of the wire 12 on the anvil surface against the pins as shown in FIG. 30. The left end of the wire is then bent around the pin 3, clearing the top of pin 5, until it is in line with the space between the pins. This loop is pushed down on pin 3 until this wire end rests on the upper edge of plate 10. This will provide the proper clearance 14 (see FIG. 18) between the crossing portions of the wire. The right end of the wire is then bent around pin 5 in a similar manner and its loop is pushed down between the pins until its straight end portion is brought against the top of the straight left end portion to form a double wire stem or shank 15 of the clip. The wire ends may be tacked together with solder to prevent opening up at the saddle 16 if desired. The solder could be built up around the wire ends below their juncture, if desired, or a separate sleeve with tapered ends could be slipped over these wires to provide a larger diameter stem 17 as shown in FIG. 6. Different gauge wire, and size, number and arrangement of pins may be used on the anvil to form different shapes and sizes of clips suitable for specific size ranges and types of lines. For example, an arrangement such as shown in FIG. 19 may be used for making the form of clip shown in FIG. 5 or that shown in FIG. 20 for making the form of clip shown in FIG. 8.

The knotless attachment is shown in FIGS. 1 to 4 and 8. The line 18 may be quickly and easily attached to the cross-over portions of a clip without making any knots, as shown in these examples. In FIGS. 1 to 4, the line attachment shown may be made as follows: The end of the line 20 is threaded into the eye 6, and held in the groove on the left side of the stem with the left hand. The line 18 is pulled up with the right hand, passed over the saddle wedge 16, down the other side of the stem 15 under the loop wire 22, and around the stem and end 20, pulling upon the line 18 to snap its first pass under the loop wire through the restricted clearance 14 between this wire and the stem, then the line is passed around the stem and end 20 one or more additional turns, snapping it through the clearance 14 after each turn by pulling up on the line 18. Two additional turns are shown wound around the stem in FIG. 1. This is normally sufficient to firmly fasten the line and lock it against slipping.

Figure 8:
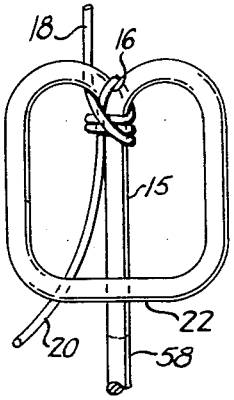

The same attachment of the line to a clip of a modified form, is shown in FIG. 8. This form of clip is adaptable for receiving many more additional turns of heavier line, and is obviously easier to thread for initiating the attachment of the line as described above.

Figure 5:
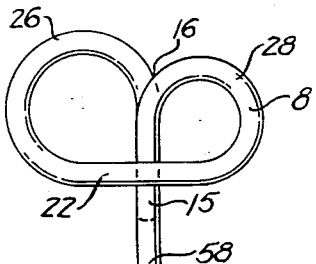
Figure 6:
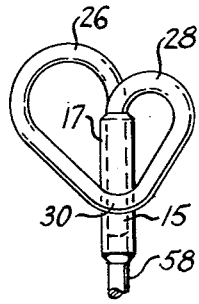

In order to make this threading easier without substantially increasing the overall size of the clip shown in FIG. 1, the left eye 26, through which the line end is to be initially threaded, may be enlarged without changing the right eye 28 (see FIG. 5).

For the stiffer lines, such as some of the mono-filament plastic lines, the size of the eyelets should be kept at a minimum, if they are to be effective in keeping the line from unravelling too much at the attachment. However, they have to be large enough to accommodate at least 5 or 6 turns of the line which may be necessary if the line is of hard plastic material that does not readily conform to the stem.

The loop wire 22 in the preferred form of clip is substantially straight for a distance where it crosses the stem and is normal thereto. However, it may be desirable for some purposes to curve this portion mildly as at 24 in FIG. 7 or more sharply as at 30 in FIG. 6.

It will be noted that all the forms shown in FIGS. 1 to 8 are what may be called right handed tie clips because the line has to be wound clockwise over the stem in order to get the benefit of the curved saddle groove at the top of the stem for effectively keeping the end of the line from slipping therethrough, with the least number of turns on the stem in addition to the first turn which could be sufficient to provide a firm fastening if the size of the line is proper and its conformation to the stem is good.

For left handed operation the whole stem should be twisted counterclockwise to bring the farthest wire end at the rear of the stem to the front, adjacent the loop wire. This reverses the saddle so that the line end has to be initially threaded into the right eye and held in the stem groove on the right side, while the line is passed over the saddle to the left and downwardly under the loop wire and counterclockwise around the stem to properly lock the end of the line in the saddle and groove against slipping therein when the line is pulled up. A left hand clip may be made in the same manner as the corresponding right hand clip on reversely arranged pins by reversing the bending operation between the right and left end wires, starting with the right end wire and bringing the left end wire down on top of the right to form the stem with the saddle groove reversed, as shown in the clip used on the lure of FIG. 13.

The tie clip may be used in line attachments for fishing tackle such as swivels, hooks, artificial lures, lead sinkers, wire and plastic leader material; its annexation to such equipment as part of the stem or shaft permits a secure fastening and locking of the line with an increase in the tensile strength of the line by elimination of sharp curves and angles at the point of contact.

It is commonly believed that reel casting of lower test strength lines is easier because of the less weight of water in the line, frictional decrease in the release from the reel and less air resistance of a smaller diameter line. This invention allows the use of lower test strength lines because of the increased saving in tensile strength by the application of these ties on the attachment. Similarly, even if the lines are considerably worn, their use can be continued by the use of these ties, all of which is at the discretion of the fisherman.

The "killer lure" and "fish head type" tie clip, shown in FIGS. 13 and 14, have a ring base loosely connected through an eye 63 in the head of the lure, to hold the clip in a substantially vertical position. This connection could be made as a solid attachment to the head of the lure and the lip guide, which cause the lure to follow a curved path and irregular movements through the water, the stem of the clip being fixed to the head, top or bottom of lure, to cause an effective attraction to fish which may be lurking in the vicinity. The tie clip shown here illustrates a left-handed clip.

FIGS. 21, 22 and 25 and base plates 66 having holes 69 for the initial attachment of the extended straight contiguous end portions in FIGS. 23, 26 and 27. These base plates have screw holes for receiving mounting screws 68, for mounting on wooden surfaces such as boat decks.

In any of these clip fixtures, the stem or shank of the clip may be bent at right angles to the mounting surface as shown at 70 in FIG. 25 or 72 in FIGS. 26 and 27, or it may be bent at any other angle to suit requirements.

Another use of the tie clip is for Boy Scout tents and trailer awnings requiring an adjustable tie, as shown in FIG. 24. It could also be used for temporary rope balancing on derrick construction.

Invariably the stake would be pulled up upon leaving the site if sufficient unwinding play does not exist. It has, in a sense, a swivel action and may be adapted for use wherever such action is desired.

Many other obvious modifications in the details of the clips or their mounting portions may be made without departing from the spirit and scope of this invention, as defined in the appended claims.

What is claimed is:

1. A tie line clip made of a wire of circular cross section and comprising a loop having straight parallel end portions contiguous to each other to form a downwardly extending grooved stem, the plane of the end portions being turned axially and substantially perpendicularly to the plane of the loop, the loop being doubled over toward the stem to form bights on opposite sides of said stem, the bights having a common lower end crossing in front of said stem, forming a pair of eyelets, the upper ends of the bights curving into the upper ends of the straight contiguous end portions to form a saddle between the bights on the top of said stem, thus permitting a tie line to be laid in the saddle and wound around the upper end portions of the stem.

2. A tie line clip made of a wire of circular cross section and comprising a loop having straight parallel end portions contiguous to each other to form a downwardly extending, vertically grooved stem, the plane of the end portions being turned axially and substantially perpendicularly to the plane of the loop, the loop being doubled over toward the stem and forming a pair of eyelets, the upper ends of the eyelets having adjacent overlapping portions curving into the upper ends of the straight contiguous end portions and forming a saddle having grooves merging into said grooved stem, whereby the tie line end may be passed from one of said eyelets over the saddle and tensed into said stem groove by line windings wrapped one or more turns around the stem.

3. A tie line clip as defined in claim 2, said contiguous parallel end portions being turned axially in a counter clockwise direction prior to doubling the loop toward the stem, to face the saddle in alignment with the stem groove in the left eyelet, for right hand tying.

4. A tie line clip as defined in claim 2, said contiguous parallel end portions being turned axially in a clockwise direction prior to doubling the loop toward the stem, to face the saddle in alignment with the stem groove in the right eyelet, for left hand tying.

5. A tie clip as defined in claim 1, the common lower lobe crossing in front of the stem being substantially horizontal and bending at its ends into substantially vertical sides of the eyelets.

6. A tie line clip as defined in claim 2 and a base fixedly mounted on said extended straight contiguous end portions.

7. A tie line clip as defined in claim 2, having one of said extended straight contiguous end portions tapered and threaded to form a screw base for said clip.

8. A tie line clip as defined in claim 2 and a lugged base of said extended straight contiguous end portions terminating in portions bent separately in opposite directions at right angles to said end portions.

9. A tie line clip as defined in claim 2, having a base on one of said extended straight contiguous end portions circularly bent at its end to define a ring-shaped base.

(References on following page)

References Cited in the file of this patent

UNITED STATES PATENTS

| | | |
|---|---|---|
| 642,753 | Pearsons | Feb. 6, 1900 |
| 660,078 | Moore | Oct. 16, 1900 |
| 1,082,874 | Jeffers | Dec. 30, 1913 |
| 1,635,283 | Lippold | July 12, 1927 |
| 1,805,833 | McLeod | May 19, 1931 |
| 2,743,496 | Looker | May 1, 1956 |
| 2,831,229 | Schlegel | Apr. 22, 1958 |